US012667080B2

(12) United States Patent
Gansel et al.

(10) Patent No.: US 12,667,080 B2
(45) Date of Patent: Jun. 30, 2026

(54) SYSTEM FOR ATTACHING EAR TAGS TO THE EARS OF ANIMALS

(71) Applicant: BioCV GmbH, Bochum (DE)

(72) Inventors: Moritz Gansel, Bochum (DE); Deniz Fuhrmann, Bochum (DE); Jonas Riepe, Bochum (DE); Lukas Arendt, Bochum (DE)

(73) Assignee: BioCV GmbH, Bochum (DE)

( * ) Notice: Subject to any disclaimer, the term of this patent is extended or adjusted under 35 U.S.C. 154(b) by 186 days.

(21) Appl. No.: 18/385,937

(22) Filed: Nov. 1, 2023

(65) Prior Publication Data

US 2024/0138371 A1 May 2, 2024

(51) Int. Cl.
*A01K 11/00* (2006.01)

(52) U.S. Cl.
CPC .................................. *A01K 11/004* (2013.01)

(58) Field of Classification Search
CPC ...................................................... A01K 11/004
See application file for complete search history.

(56) References Cited

U.S. PATENT DOCUMENTS

| | | | |
|---|---|---|---|
| 4,718,697 A | * | 1/1988 | Berardus van Amelsfort ............ A01K 11/004 40/299.01 |
| 12,029,197 B1 | * | 7/2024 | Biffert .................. A01K 29/005 |
| 2017/0344873 A1 | * | 11/2017 | Pochiraju ................. H01Q 1/36 |
| 2018/0132449 A1 | * | 5/2018 | Auer ..................... A01K 11/004 |
| 2019/0365324 A1 | * | 12/2019 | Chang .................. A01K 11/004 |
| 2020/0221666 A1 | * | 7/2020 | Tryding ............... A01K 11/004 |
| 2023/0189757 A1 | * | 6/2023 | Cohen .................. A01K 29/005 119/174 |
| 2023/0404031 A1 | * | 12/2023 | Chang .................. A01K 11/004 |
| 2024/0164345 A1 | * | 5/2024 | Chitty ................. A01K 11/001 |
| 2024/0206430 A1 | * | 6/2024 | Olsson ................. A01K 11/004 |
| 2024/0338548 A1 | * | 10/2024 | Muller ............. B29C 45/14467 |
| 2024/0381840 A1 | * | 11/2024 | Vandierendonck .. A01K 11/004 |

* cited by examiner

*Primary Examiner* — Gary C Hoge

(57) ABSTRACT

The disclosure relates to an ear tag attachment system for animals having an ear tag and a thorn, wherein the ear tag has an opening through which the thorn is insertable in a manner such that there is a connection between the ear tag and the thorn, wherein the ear tag has a rigid section and an elastic section and the opening for receiving the thorn is located in the elastic section. In this way, electronic components can be accommodated in the rigid section in a protected manner, but at the same time a secure connection to the ear of the animal is ensured.

10 Claims, 3 Drawing Sheets

(1)

(1.1)

(1.2)

(1.3)

(1.4)

(1.5)

(1.6)

(1)

(1.2)

(1.6)

[Identification nr.]

SYSTEM FOR ATTACHING EAR TAGS TO THE EARS OF ANIMALS

FIELD AND BACKGROUND OF THE INVENTION

In the labelling of pigs and similar large to small animals, especially livestock, ear tags and thorn parts made of an elastic material are commonly used. Thermoplastic plastics are usually used for this purpose. These ear tags are pressed with the thorns by so-called ear tag pliers and connected. The elastic material allows the ear tag and the so-called thorn to be connected with a low loss rate, but is not suitable for accommodating electronic components. Printed circuit boards (PCBs) and batteries are sensitive components and are usually placed in a protected environment rigidly connected to each other, so they need a non-elastic sheath and support. Using such a rigid material for the ear tag would result in irreversible deformation or damage to the opening by the thorn in the process of piercing. This would significantly reduce the stability of the connection between the thorn and the ear tag. This is for example problematic when used for marking pigs, as the behavior of the animals places high demands on the physical resilience of the ear tags and the loss rates in the marking are therefore for example high in this sub-segment of animal husbandry.

SUMMARY OF THE INVENTION

The disclosure relates to an ear tag attachment system for animals having an ear tag and a thorn, wherein the ear tag has an opening through which the thorn is insertable in a manner such that there is a connection between the ear tag and the thorn, wherein the ear tag has a rigid section and an elastic section and the opening for receiving the thorn is located in the elastic section.

BRIEF DESCRIPTION OF THE SEVERAL VIEWS OF THE DRAWINGS

Figure 3:
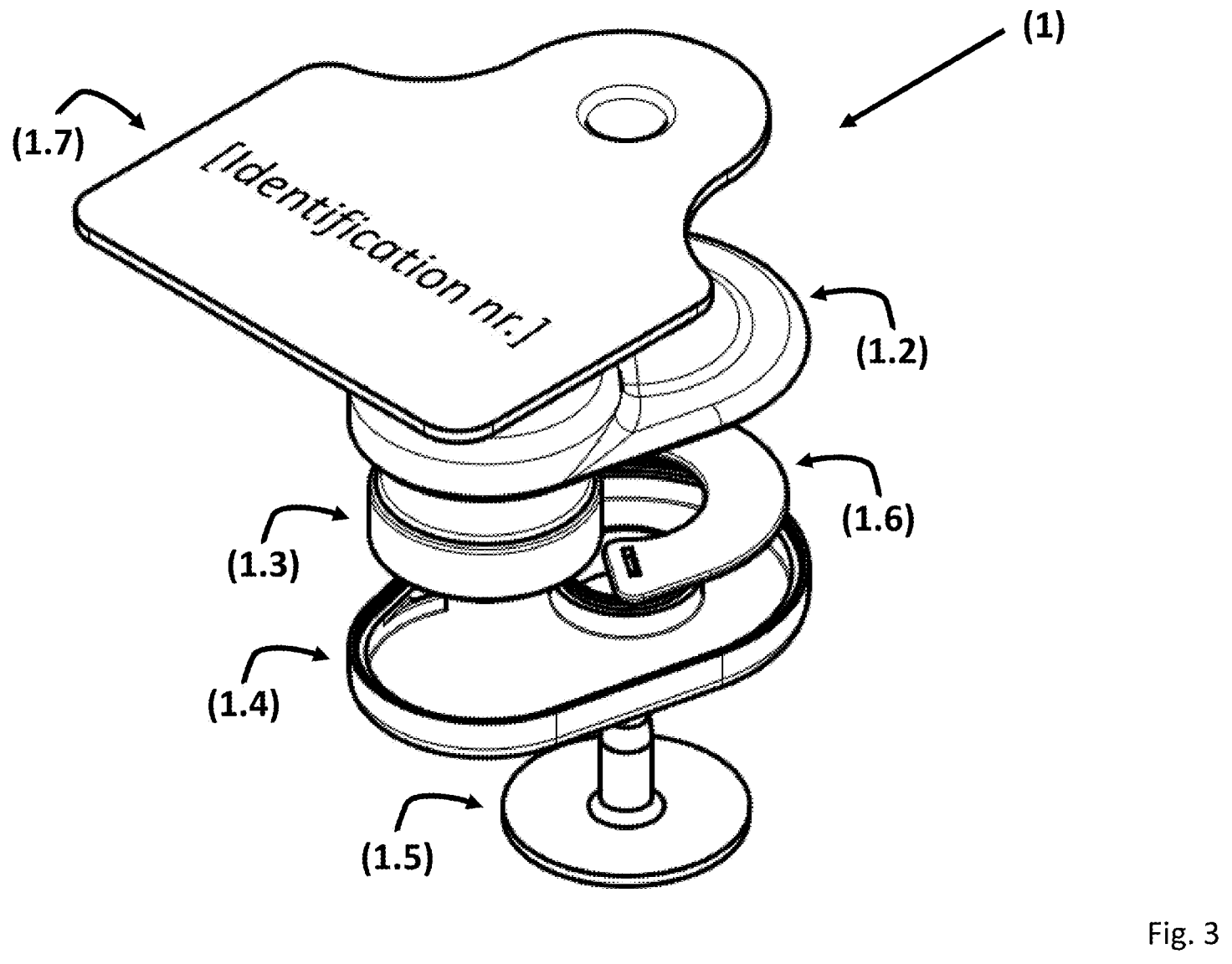

FIG. 3 shows the ear tag attachment system 1 according to the disclosure in a perspective view similar to FIG. 1.

DESCRIPTION OF SPECIFIC EMBODIMENTS OF THE INVENTION

Figure 1:
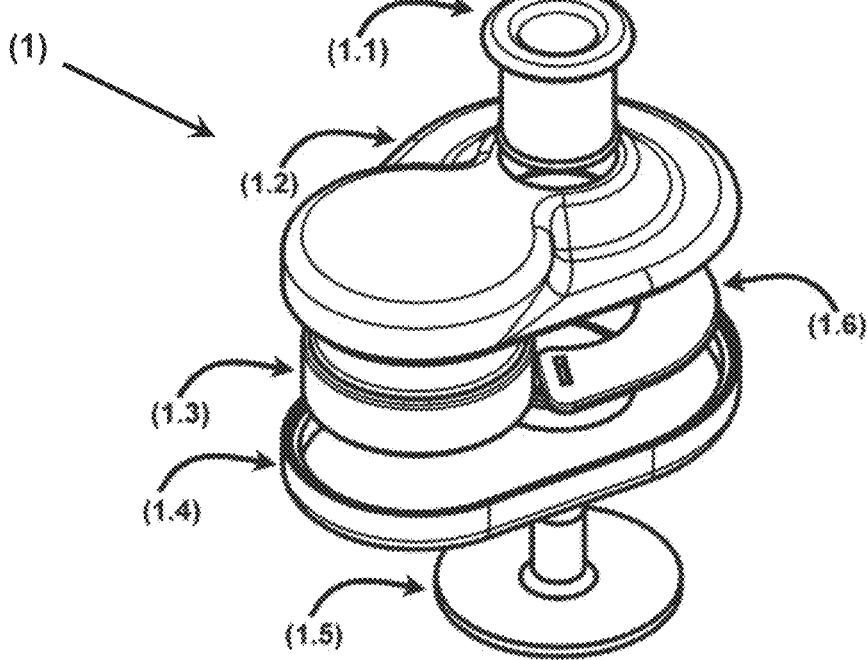
FIG. 1 shows an ear tag attachment system according to the disclosure in an exploded view seen from obliquely above and FIG. 2 shows an ear tag attachment system according to the disclosure in a sectional view from the side.

The disclosure relates to an ear tag attachment system for animals with an ear tag and a thorn, wherein the ear tag has an opening through which the thorn can be inserted in such a way that there is a connection between the ear tag and the thorn, wherein the ear tag has a rigid section and an elastic section and the opening for receiving the thorn is arranged in the elastic section. Generally, the connection is a force-locking or form-locking connection.

The ear tag attachment system according to the disclosure is elastically deformable in the area of the opening (perforation hole). This enables low-loss and secure attachment to the animal. On the other hand, the rigid section of the ear tag has sufficient strength and a sufficient bending resistance moment. Thus, there is no or at most only a slight bending load on the electronic components housed in the rigid section, such as for example printed circuit board and battery. This is intended to enable the use of complex electronic units in the field of animal identification and animal monitoring without having to accept high loss rates of the ear tags. The disclosure is used for example in the field of livestock farming, for example for medium-sized animals such as pigs, but also for cattle and other livestock.

The disclosure is based on forming the ear tag in two parts, namely with a rigid section and an elastic section. While the rigid section is suitable for securely holding electronic components, the elastic section serves for attachment to the ear of the animal. For this purpose, the elastic section has an opening for receiving the thorn. The thorn typically has an arrow shape and is driven through the opening with standard ear tag pliers in such a way that a connection is made between the elastic section and the thorn. This connection is usually force-locking or form-locking. The elastic section forms a loss-proof connection with the thorn and thus fixes the ear tag as a whole. The thorn may be a commercially available thorn for ear tags.

Opening in this context means any opening or recess that can accommodate a thorn in such a way that a permanent connection is brought about. The opening is open at least on one side, but frequently on both sides.

As already mentioned, the disclosure may be used for example when electronic components are to be accommodated. These are securely housed in the rigid section. They may be, for example, electronic markers, sensors, transmitters, means for locating the animals, means for monitoring the health of the animals, or the like. The rigid section of the ear tag is designed to protect the electronic components from damage during the daily life of the animals. For this purpose, the rigid section may have a carrier and a cover.

The electronic components typically comprise at least a printed circuit board and a battery, as well as sensors. However, other components may be present.

The rigid section and the elastic section are connected to each other. This connection can be made before the ear tag is attached to the animal, but a subsequent connection is also possible. In the latter case, the elastic section alone is first fixed to the ear via the thorn, and only then is the elastic section in turn connected to the rigid section. The connection between the rigid section and elastic section can for example be force-locking or form-locking, but a substance-locking connection is also possible, for example if the connection is made before the ear tag is attached to the animal.

For example, the elastic section is cylindrical, with the rigid section having a receptacle for the cylindrical elastic section. The elastic section can therefore be inserted into the rigid section and connected thereto. The ear tag thus has a rigid section with a cylindrical receptacle into which the elastic section is inserted, i.e. the rigid section surrounds the elastic section. In order to be able to use different sized livestock thorns, the inner diameter of the receptacle of the rigid section or the outer diameter of the elastic section can be variable. In addition to cylindrical elastic sections, however, any other geometric shapes are possible, whereby the contour of the elastic section should be matched to the contour, for example a corresponding receptacle and/or counter form (negative) in the rigid section.

The ear tag attachment system can be removed from the animal by cutting the thorn. The ear tag can then either be reused in its entirety or the elastic section can be replaced with a new elastic section to create a reusable ear tag. The essential and more valuable part of the ear tag, which houses the electronic components, can therefore be used again.

Furthermore, the rigid section 1.2 and/or the elastic section 1.1 of the ear tag attachment system can have markings

1.7 to identify the animal, for example in the form of an imprint or an embossing. This may be, for example, a number that uniquely identifies the animal.

DETAILED DESCRIPTION OF THE DRAWINGS

The disclosure is illustrated by way of example in the attached figures in more detail. The figures represent an example of an embodiment of the disclosure, which do not limit the scope of protection.

FIG. 1 shows the ear tag attachment system 1 according to the disclosure. The rigid section is composed of a carrier 1.4 and a cover 1.2. A printed circuit board 1.6 with further electronic components and a battery 1.3 are accommodated here within the rigid section.

The rigid section has a cylindrical receptacle into which the internally hollow elastic section 1.1 is inserted. To attach the ear tag to the ear of the animal, it is held against the animal on one side of the ear and a thorn 1.5 is inserted from the other side using ear tag pliers. The thorn 1.5 penetrates the opening in the elastic section 1.1 and thus creates a permanent connection between the ear tag and the animal.

Figure 2:
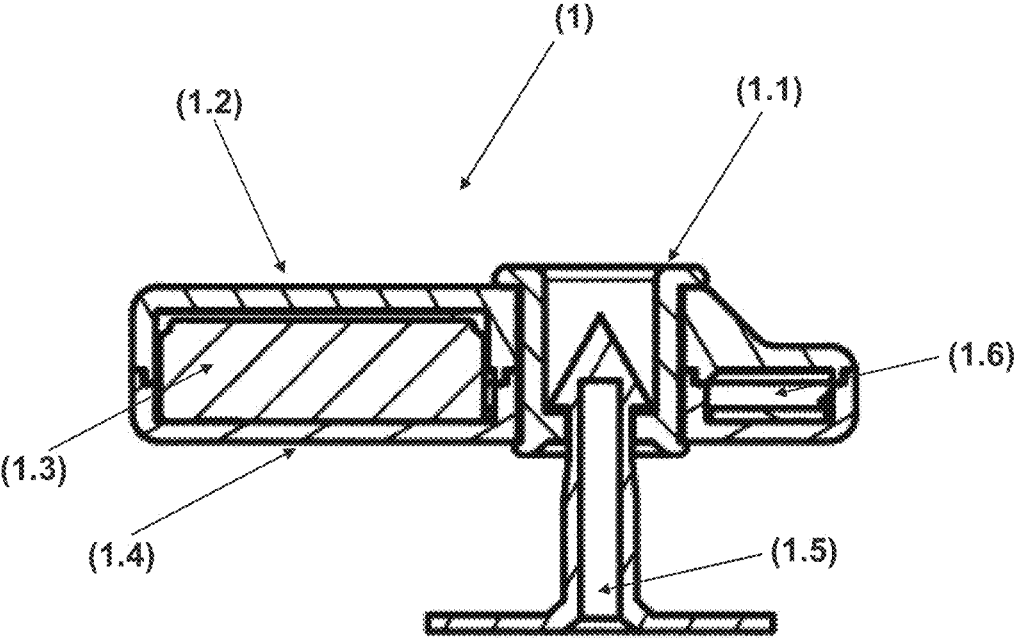

The ear tag according to the disclosure is shown in FIG. 2 in a sectional view from the side. The arrow-shaped thorn 1.5, which has been pressed into the elastic section 1.1, can be seen. The elastic section 1.1, in turn, is cylindrical and is inserted in a matching receptacle in the rigid section 1.2, 1.4. The electronic components are protected within the rigid section.

The disclosure provides an ear tag attachment system which, on the one hand, can be without problems and permanently attached to the ear of the animal and, on the other hand, is suitable for accommodating electronic components.

The invention claimed is:

1. An ear tag attachment system for animals having an ear tag and a thorn, wherein the ear tag has an opening through which the thorn is insertable in a manner such that there is a connection between the ear tag and the thorn, wherein the ear tag has a rigid section and an elastic section, wherein the opening for receiving the thorn is located in the elastic section, wherein the elastic section is removable and replaceable, thereby enabling reuse of the rigid section after removal of the elastic section.

2. The ear tag attachment system of claim 1, wherein electronic components are disposed in the rigid section.

3. The ear tag attachment system of claim 2, wherein the electronic components comprise a printed circuit board, sensors, or a battery.

4. The ear tag attachment system of claim 1, wherein the rigid section and the elastic section are connectable to each other before or after the ear tag attachment system is secured to the animal.

5. The ear tag attachment system of claim 4, wherein the connection between the rigid section and the elastic section is by means of a snap-fit, frictional engagement or adhesive bonding.

6. The ear tag attachment system of claim 1, wherein the elastic section is cylindrical and the rigid section includes a receptacle for the elastic section.

7. The ear tag attachment system of claim 1, wherein the ear tag attachment system is removable from the animal by cutting the thorn.

8. The ear tag attachment system of claim 7, wherein the rigid section is reusable after replacement of the elastic section and thorn.

9. The ear tag attachment system of claim 1, wherein the rigid section or the elastic section includes markings for identifying the animal.

10. The ear tag attachment system of claim 1, wherein an outer diameter of the elastic section is varied to use different sized livestock thorns.

* * * * *